United States Patent
Cagney et al.

(10) Patent No.: US 7,299,715 B2
(45) Date of Patent: Nov. 27, 2007

(54) NON-HOMOGENEOUS ENGINE COMPONENT FORMED BY POWDER METALLURGY

(75) Inventors: John L. Cagney, Downers Grove, IL (US); Donald R. Van Der Moere, Spencer, IN (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 436 days.

(21) Appl. No.: 10/854,937

(22) Filed: May 27, 2004

(65) Prior Publication Data

US 2005/0262962 A1 Dec. 1, 2005

(51) Int. Cl.
*F16C 7/00* (2006.01)
(52) U.S. Cl. .................................... 74/579 E
(58) Field of Classification Search .............. 74/579 R, 74/580, 581, 579 E
See application file for complete search history.

(56) References Cited

U.S. PATENT DOCUMENTS

| | | |
|---|---|---|
| 4,419,413 A | 12/1983 | Ebihara |
| 5,353,500 A | 10/1994 | Hoag et al. |
| 5,551,782 A | 9/1996 | Arnhold et al. |
| 5,972,071 A | 10/1999 | Koike et al. |
| 6,055,884 A | 5/2000 | Lantz et al. |
| 6,070,323 A | 6/2000 | Koike et al. |
| 6,279,455 B1 | 8/2001 | Kruse |
| 6,318,243 B1 | 11/2001 | Jones |
| 6,363,608 B1 | 4/2002 | Koike et al. |
| 6,435,077 B1 | 8/2002 | Damour et al. |
| 6,477,941 B1 | 11/2002 | Zhu et al. |
| 6,626,576 B1 | 9/2003 | Cadle et al. |
| 6,825,450 B2 | 11/2004 | Ribeiro et al. |

FOREIGN PATENT DOCUMENTS

| | | |
|---|---|---|
| DE | 3305879 A1 | 8/1984 |
| DE | 4307560 A1 | 9/1994 |
| GB | 2 070 068 A | 9/1981 |
| JP | 2001335814 A | 12/2001 |
| JP | 2002130048 A | 5/2002 |
| JP | 06330106 A | 11/2002 |

OTHER PUBLICATIONS

Kemnitz et al; "Monotherm, a New Forged Steel Piston Design for Highly Loaded Diesel Engines," SAE Technical Paper Series 2000-01-0924, Mar. 6-9, 2000.

*Primary Examiner*—Vicky A. Johnson
(74) *Attorney, Agent, or Firm*—Jeffrey P. Calfa; Gerald W. Askew (57) ABSTRACT

A connecting rod unitarily formed in a powder metallurgy process provides a non-homogenous structure. The connecting rod has a piston end, a crankshaft end, and an interconnecting shank. The piston end, the crankshaft end, and the interconnecting shank are formed of a structural material.

2 Claims, 9 Drawing Sheets

FIG. 15     FIG. 16

NON-HOMOGENEOUS ENGINE COMPONENT FORMED BY POWDER METALLURGY

FIELD OF THE INVENTION

The present invention relates to components formed by powder metallurgy and, more specifically, to a method and apparatus for forming components by powder metallurgy.

BACKGROUND OF THE INVENTION

Powder metallurgy is a common manufacturing method used to produce components of high quality for applications such as engines. Powder metallurgy is often employed in the manufacture of engine components because it is economical, flexible, and can produce a finished part that requires less machining or secondary processing than other methods of forming components. Powder metallurgy allows for a component to be formed of a wide variety of alloys, composites, and other materials to provide the finished component with desirable characteristics. Powder metallurgy is well suited to manufacture parts of a wide range of sizes and shapes. Also, powder metallurgy can reliably produce parts with consistent dimensions and advantageous physical properties.

Figure 1:
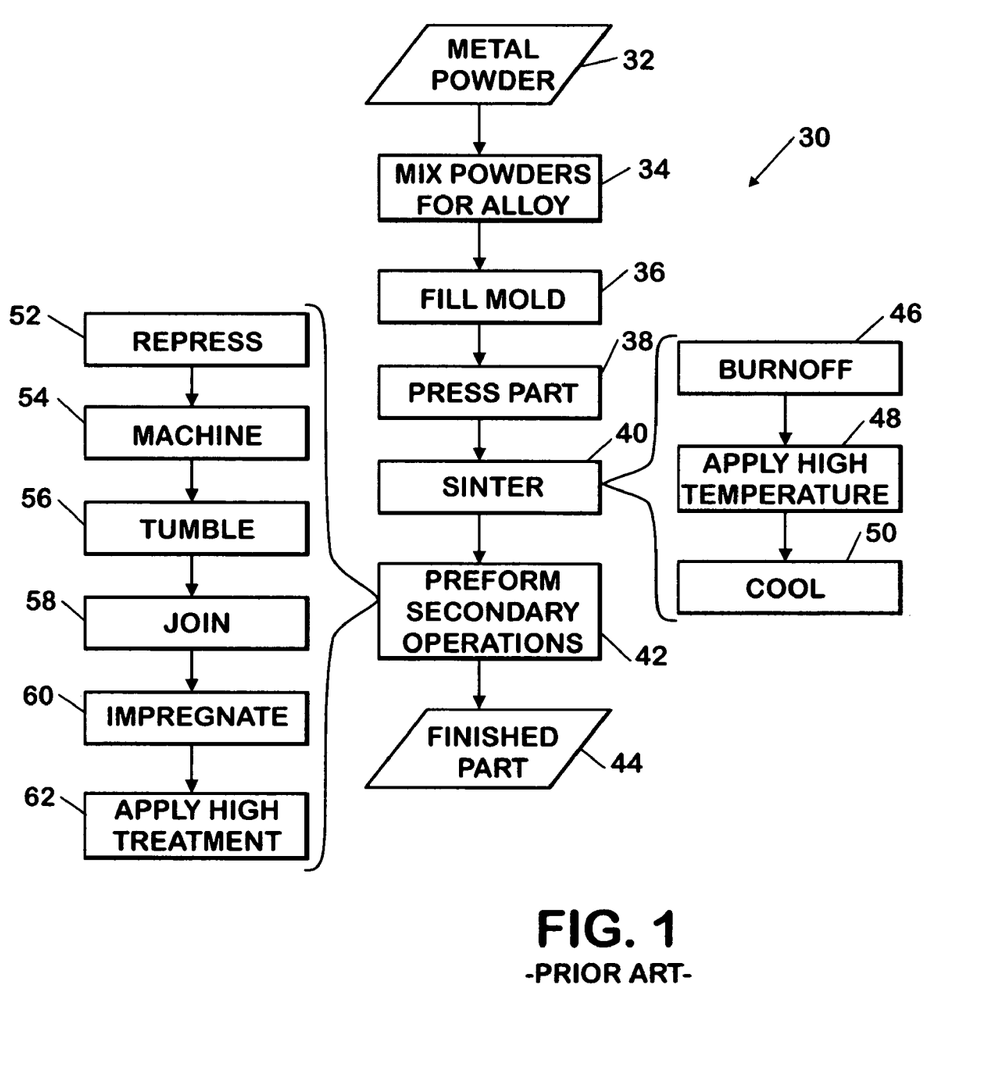
FIG. 1 is a process flowchart for a powder metallurgy manufacturing process according to the prior art.

Referring to FIG. 1, a process chart for the conventional powder metallurgical component forming process 30 is shown. First, the metal powders 32 that comprise the component are provided. Often, lubricants are added to the metal powders to decrease the wear of pressing machinery. Next, the base powders are mixed 34 to form a homogenous mixture. The finished part is ultimately a homogeneous alloy of the constituent metal powders.

A mold or die is then filled 36 with the mixed powders. The die, when closed, has an internal cavity somewhat similar in shape to the final part. The powder is compressed 38 within the die to form a so-called "green part." The compaction 38 is usually performed at room temperature and at pressures, for example, in the range of 30-50 tons per square inch. The green part, also referred to as a "green compact," has the desired size and shape for the next operation when ejected from the die. After compaction 38, the green part has sufficient strength for further processing.

The green part is subjected to a sintering process 40. A variety of secondary operations 42 may be performed on the part after sintering 40, depending on its intended use, the process yielding a finished part 44.

Generally, sintering 40 involves subjecting the green part to a temperature, for example, of 70-90% of the melting point of the metal or alloy comprising the green part. The variables of temperature, time, and atmosphere are controlled in the furnace to produce a sintered part having improved strength due to bonding or alloying of the metal particles. The sintering process 40 generally comprises three basic steps conducted in a sintering furnace: burnoff 46, sinter 48, and cooling 50. Continuous-type sintering furnaces are commonly used to perform these steps. The burnoff chamber is used to volatize the lubricants used in forming green part 46. The high-temperature chamber performs the actual sintering 48. The cooling chamber cools the sintered part prior to handling 50.

The parts that exit the sintering furnace 40 after cooling 50 may be considered complete. Alternatively, they may undergo one or more secondary operations 42. Secondary operations include, for example, re-pressing (forging) the component 52, machining 54, tumbling 56, and joining the component with additional components 58 as part of an overall assembly. The secondary operations 42 may also include the impregnation of oils or lubricants 60 into the part for conveying self-lubricating properties. The sintered component may also undergo heat treatment 62 to provide certain characteristics and properties to the component, such as strength. Those skilled in the art will recognize that other secondary operations may be performed. The secondary operations 42 may be performed individually or in combination with other secondary operations. Once all the secondary operations 42 are performed, the component or part 44 is finished.

U.S. Pat. Nos. 6,055,884, 5,551,782, and 5,353,500 each disclose connecting rods for use in an internal combustion engine.

Figure 2:
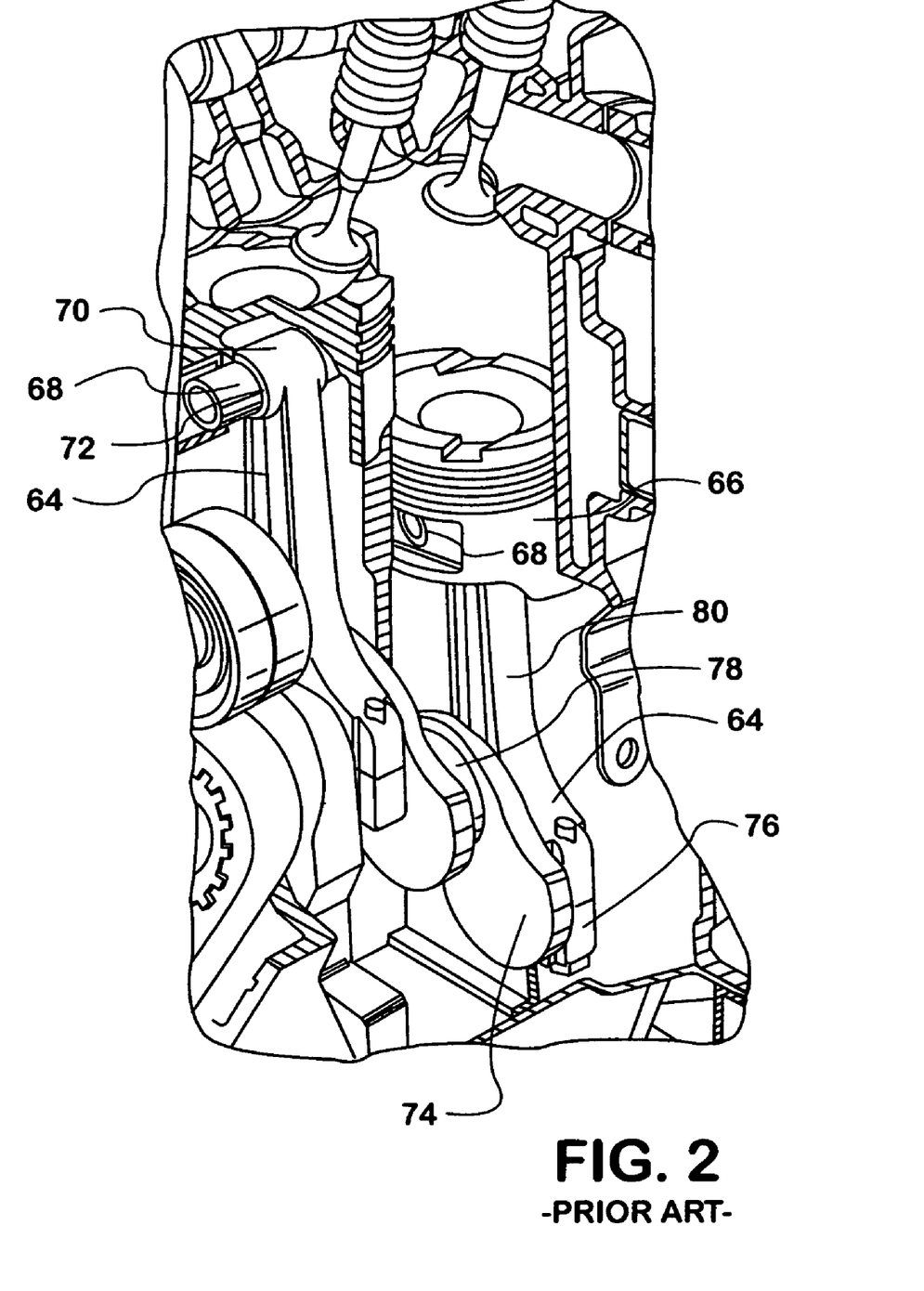
FIG. 2 is a partial cutaway perspective view of a vehicular engine according to the prior art.

FIG. 2 illustrates the internal detail of a conventional internal combustion engine to illustrate the use of a connecting rod 64. Connecting rod 64 is pivotally connected to a piston 66 and the crankshaft 74. The connecting rod 64 is connected to the crankshaft 74 at a large or crank end 76. The large end 76 of the rod 64 receives a shaft portion ("crank pin") 78 of the crankshaft 74. The connecting rod 64 is further connected to a piston 66 at a small or piston end 70 of the rod 64. A pin ("wrist pin") 68 is used to permit rotation between the small end 70 of the connecting rod 64 and the piston 66.

Figure 3:
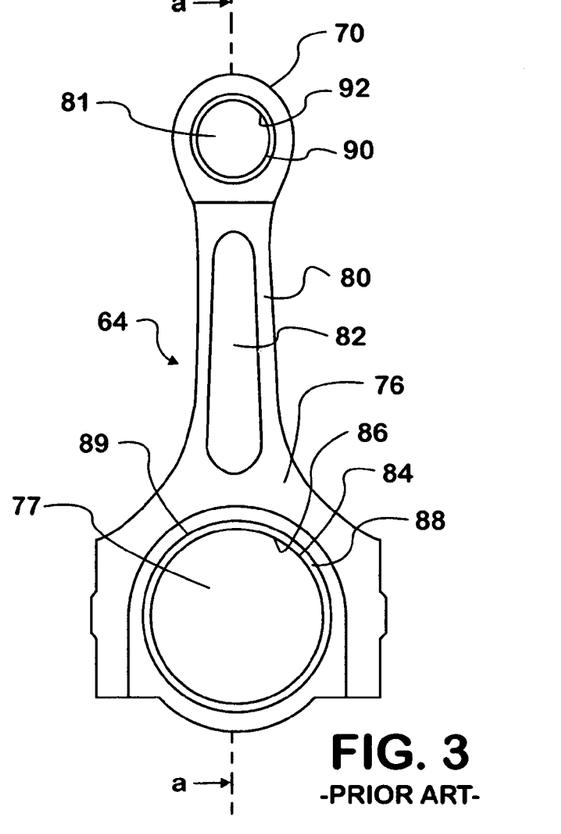
FIG. 3 is a plan view of a connecting rod according to the prior art.
Figure 4:
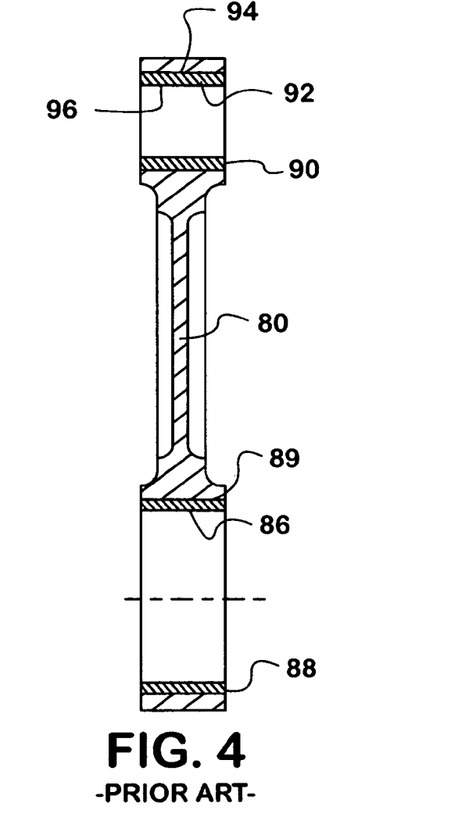
FIG. 4 is a sectional view of the connecting rod of FIG. 3 taken along line a-a.
Figure 5:
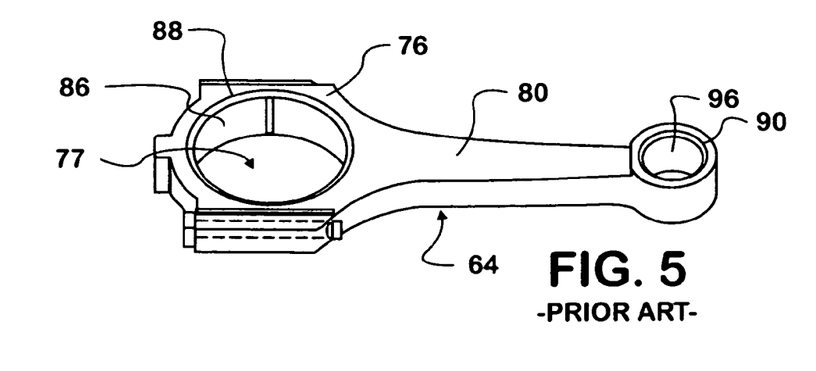
FIG. 5 is a perspective view of a connecting rod according to the prior art.

Referring to FIG. 3 through FIG. 5, a conventional connecting rod 64, manufactured according to conventional methods is shown. Connecting rod 64 comprises a piston end 70, a crankshaft end 76, and a shank 80. The shank 80 is often provided with one or more recesses 82 for weight savings. Crankshaft end 76 includes a large eye 77 for receiving the crank pin 78. Crankshaft end 76 includes a crank bearing 84 for minimizing wear and friction due to the rotational movement of shaft 78 within large eye 77. The bearing 84 comprises bearing material 88, an outer material seating surface 89 and an inner bearing surface 86. Those of skill in the art will recognize that the crank bearing 84 forms a hydrodynamic bearing when lubricating oil is provided between the crank pin 78 and the inner bearing surface 86.

The piston end 70 of connecting rod 64 includes a small eye 81 for receiving wrist pin 68. Small eye 81 is provided with a bushing 90 for reducing friction and wear due to rotational motion in operation. Bushing 90 comprises discrete or separate bearing material 92, an inner bearing contact surface 94, and an outer bearing seating surface 96.

A connecting rod 64 is ordinary comprised of a steel or aluminum alloy. Titanium alloys are now also used for connecting rods 64. The bushing 90 is typically comprised of bronze.

The crank bearing 84 and bushing 90 are conventionally provided to connecting rod 64 as part of a secondary manufacturing and assembly process. Each bearing 84 and bushing 90 are typically formed as part of its own separate manufacturing process and then joined with the connecting rod 64 as a separate manufacturing or assembly step. The additional steps add time, tooling, and labor costs to the manufacturing process. A continuing goal of all manufacturing is to reduce costs.

Therefore, there remains a need to provide connecting rods for engines that have a reduced number of manufacturing steps, tooling, parts, and labor.

SUMMARY OF THE INVENTION

A connecting rod includes non-homogenous structure unitarily formed in a powder metallurgy process with at least two different metallic constituents providing dissimilar characteristics at discrete locations of the structure.

DETAILED DESCRIPTION

Figure 6:
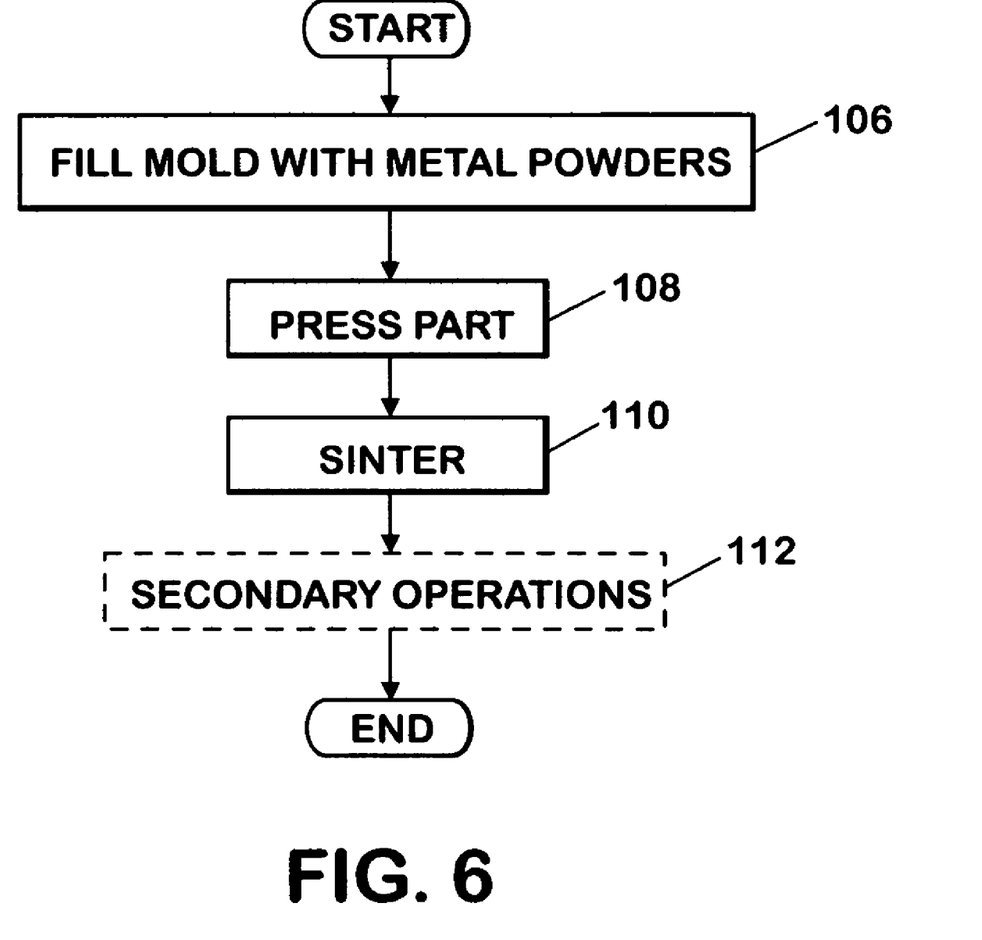
FIG. 6 is a process flowchart for fabricating a non-homogenous component using the powder metallurgy manufacturing process in accordance with the present invention.

FIG. 6 illustrates a process for manufacturing a non-homogenous powder metallurgical manufactured component, including a connecting rod. One or more metal powders are introduced into a mold at step 106. Two, three, or more metal powders may be introduced simultaneously (in parallel), at different times (in series), or in some combination thereof. Each metal powder may be a mixture of constituents. The metal powders may be mixed prior to introduction, except as desired for a non-homogeneous result. At step 108, the powder in the mold is pressed to form a green part. The green part is sintered at step 110. Optionally, one or more secondary operations, such as forging, machining, heat treating, finishing, and so forth are performed at step 112. Those skilled in the art will recognize that additional layering of powdered metals and/or process steps may be performed without deviating from the spirit and scope of the present invention.

Figure 7:
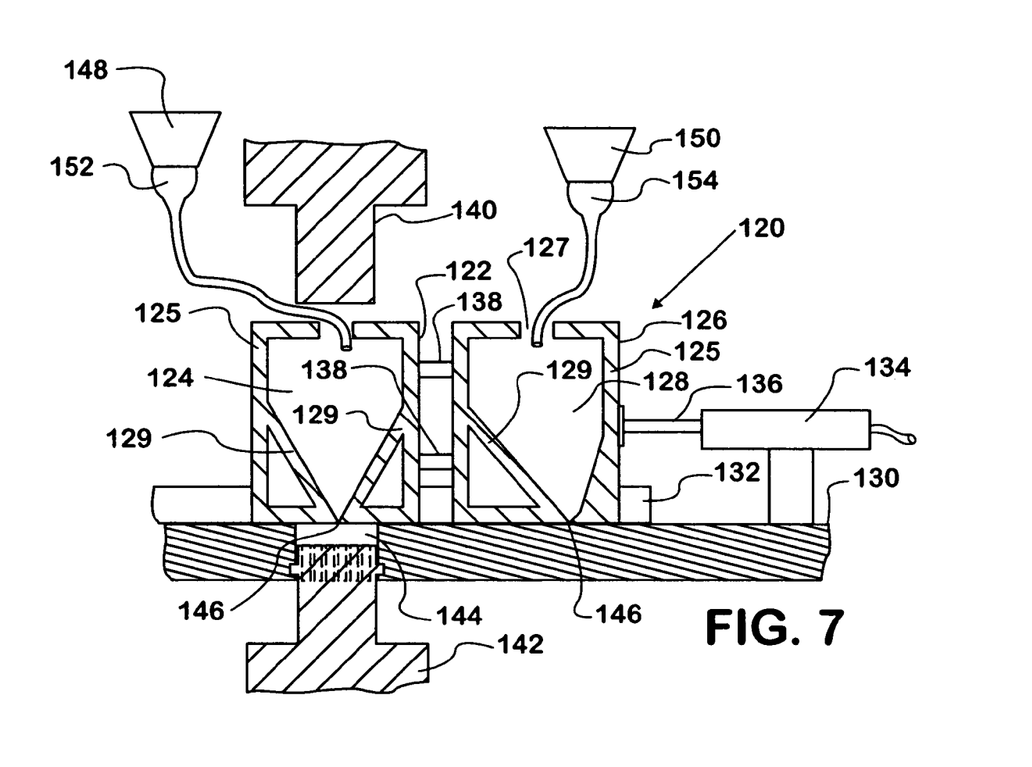
FIG. 7 is a side cutaway view of the green part forming apparatus in accordance with the present invention.

One embodiment of a green component forming apparatus 120 is shown in FIG. 7. The green part forming apparatus 120 may be referred to generally as a feedshoe apparatus 120. The feedshoe apparatus 120 generally comprises a powder filling vessel 122 actuatable by an actuator cylinder 134, an upper punch 140, a lower punch 142, and a powder hopper 148. More particularly, a first vessel 122 is rigidly connected to a second vessel 126 by one or more connection members 138. The second vessel 126 is connected to an actuator cylinder 134 via a piston 136. The actuator cylinder 134 may be a hydraulic or pneumatic cylinder for urging the piston 136 in or out, thereby guiding first 124 and second 125 vessels in a controlled movement. Each vessel 124, 126 comprises side walls 125 defining an interior cavity 124, 128 therein. The side walls 125 have sloped portions 129 for directing powder towards a powder outlet valve 146. A top opening 127 in the vessel 122, 126 is sized to receive a chute 152, 154 connected to hopper 148, 150. The hoppers 148, 150 receive a respective first and second powdered metal that are provided to a respective first interior cavity 124 and second interior cavity 128. The first chute 152 and second chute 154 comprise a flexible tube configured to allow for the linear movement of the first vessel 122 and second vessel 126. Both first and second vessels 122, 126 move linearly by sliding on bridge member 132. Each of the bridge member 132 and actuator cylinder 134 are mounted on a die table 130.

Figure 8:
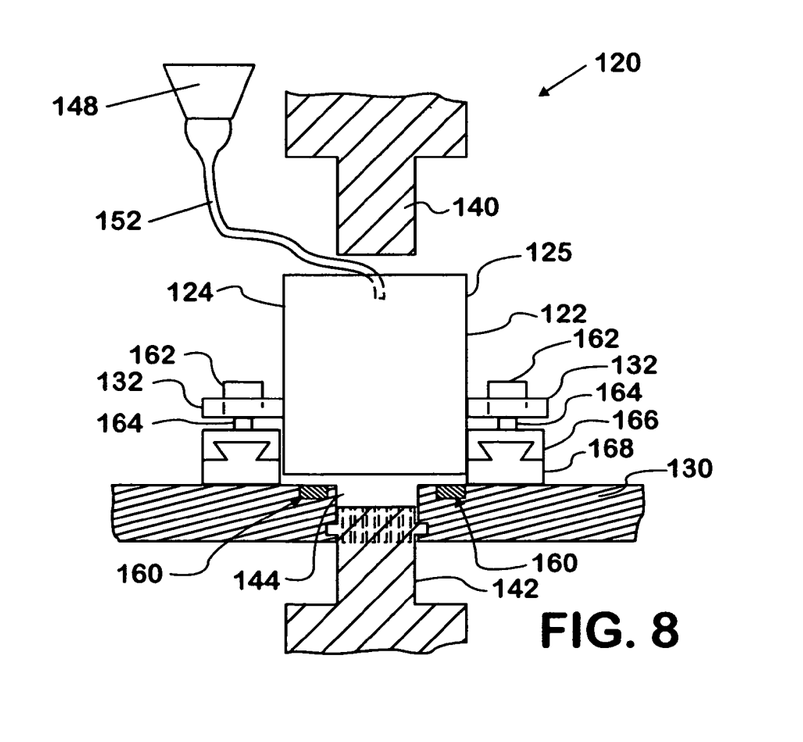
FIG. 8 is a front view of a green part forming apparatus in accordance with the present invention.

A side view of the feedshoe apparatus 120 is shown in FIG. 8. One or more locking mechanisms 160 are provided to the die table 130. The locking mechanisms 160 allow for registration of the vessels 122, 126 during a die cavity 144 filling operation. The locking mechanism 160 may be a magnet or other locking means such as a male-female socket or equivalent thereto.

The bridge member 132 is slidably disposed on the guides 166. Each guide 166 is further disposed upon a rail 168. An elevation cylinder 162 is disposed on each bridge member 132 and configured to elevate the bridge member 132 above the guides 166 by extension of an elevation piston 154. The separation shown in FIG. 2 between the first vessel 122 and the die cavity 144 allows the actuator cylinder 162 to move the vessel 122 transverse to the cavity 144. The vessels 122, 126 are advantageously moved away from the punches 140, 142 such that the vessels 122, 126 do not interfere with the pressing process.

Figure 9:
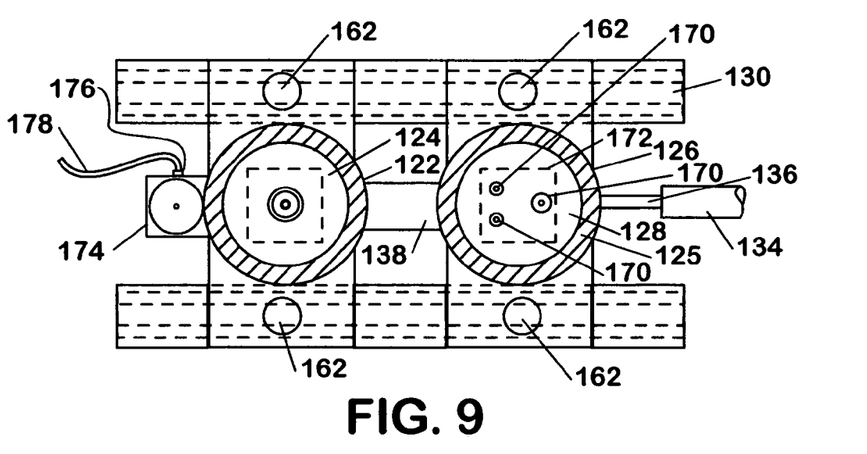
FIG. 9 is a top view of a green part forming apparatus in accordance with the present invention.

Referring to FIG. 9, a top view of the feed shoe apparatus 120 is shown. Each vessel 122, 126 is depicted in a partial cutaway to illustrate interior detail. A dashed outline of the die cavity perimeter 172 is shown for reference purposes. One or more powder egresses 170 are disposed in the bottom surface of each vessel 122, 126. The powder egresses 170 include the valves 149 for controlling the passing of the powder metal into the die cavity 144. The egresses 170 may be sized to control the relative amount of flow through a particular egress 170 during a filling operation. The first vessel 122 is shown with a single egress 170. The second vessel 126 is shown as having three egresses 170 with differing sizes. Various polygonal or eccentric shapes or varying size may be employed in place of the circular-shaped egresses without departing from the scope of the present invention.

The size and placement of the powder egresses 170 are advantageously chosen to correspond with the provision of predetermined characteristics for the finished part. For example, a connecting rod for a piston in an internal combustion engine utilizes a bearing as part of the wrist pin assembly. The conventional method for manufacturing a connecting rod is to provide a separately formed bearing to the preformed connecting rod as part of a secondary operation. The apparatus and method disclosed herein provides for a powder egress advantageously positioned at the precise location to form a unitary bearing integral to the connecting rod.

The feedshoe apparatus shown in FIG. 9 additionally includes a liquid injection apparatus 174. The liquid injection apparatus 174 injects liquids to the first interior cavity 124 during a forming process. An inlet to the injection apparatus 176 is connected to a liquid conduit 178, which supplies a liquid solution. The apparatus may comprise a solenoid valve, such as a zero dead leg volume solenoid valve. A variety of suitable dripless valves may be used without departing from the scope of the present invention. Those of skill in the art will recognize that the present invention may also be practiced with a second liquid injection apparatus provided to the second vessel, or alternatively, one liquid injection apparatus in communication with both of the first and second vessels.

The liquid solution may include aqueous solutions, lubricants, surfactants, or activation solutions for cleaning metal particulates for cold welding. The liquid solution may also include any solution that is intended to be incorporated into the material, such as a hardener, or solvent. The injection of lubricants may be employed to reduce wear to the die cavity of the apparatus.

Figure 10:
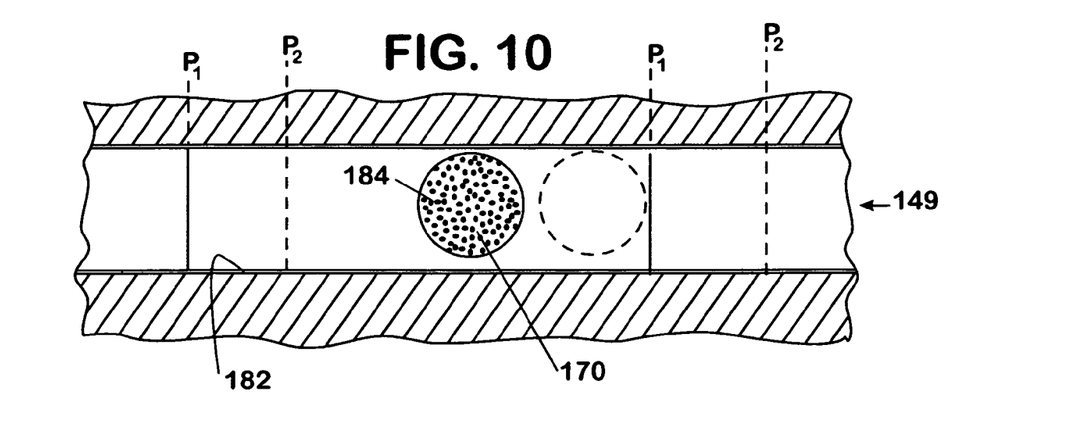
FIG. 10 is a partial top cutaway detailed view of a feed valve for a green part forming apparatus in accordance with the present invention.

FIG. 10 illustrates a valve assembly 149 that comprises the powder egress 170 of the vessel 122, 126. A housing surface 182 in conjunction with slide hole 124 define an open position $P_1$ and a closed position $P_2$ for the powder egress 170. The slide hole 184 moves between positions $P_1$ and $P_2$ as the actuator 134 linearly translates the vessel 122, 126. The open condition permits metal powder to freely exit the vessel and enter the die cavity. The closed position blocks the transfer of powder to the cavity. Other methods or devices for cutting off the flow of powder from the feedshoe to the die cavity may utilized without departing from the scope of the present invention.

Figure 11:
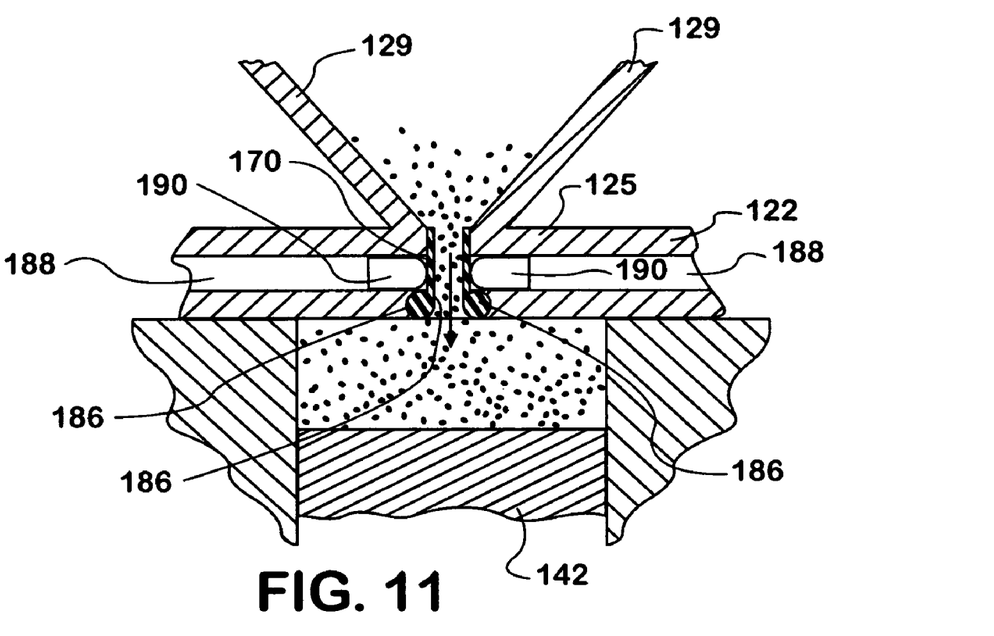
FIG. 11 is a partial cutaway side detailed view of a powder egress in the open position in accordance with the present invention.
Figure 12:
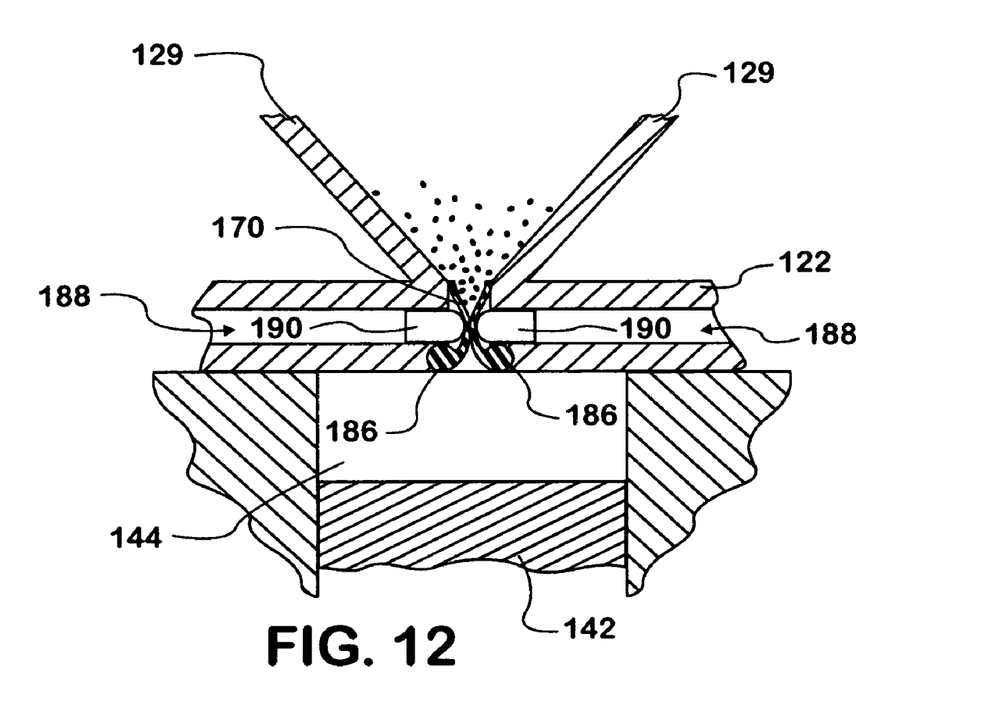
FIG. 12 is a partial cutaway side detailed view of a powder egress in the closed position in accordance with the present invention.

FIG. 11 and FIG. 12 depict an alternative embodiment of an apparatus and method for controlling the flow of metal powder into the die cavity 144. A feedtube 186 communicates between the interior cavity 124, 128 of the vessel 122, 126 and the die cavity 144. The feedtube 186 is comprised of a flexible material, such as rubber. The bottom sidewall of the vessel 122, 126 defines a channel 188 therein as shown in the figures. A pincher or crimper device 190 is disposed within the channel 188. The feedtube 186 is in the open position, as shown in FIG. 11, when the crimping devices 190 are withdrawn or not pressing on the tube 186.

FIG. 12 shows the tube 186 in a closed position wherein the crimping devices 190 press on the tube sidewalls until the sidewalls contact, thereby blocking powder flow. The crimpers 190 are urged towards the feedtube 186 by way of pneumatic control. High pressure is presented to the channel 188, which urges the crimpers 190 towards the tube 186. The removal of this high pressure condition causes the natural resiliency of the tube 186 to re-open, thereby permitting powder flow. Mechanical means, such as a linkage, may be used instead of the pneumatic drive means without departing from the scope of the present invention.

A method and apparatus for manufacturing a non-homogeneous article with powder metallurgy are described in FIG. 6 through FIG. 8 and the associated text. The following description is more particularly directed towards manufacturing a connecting rod for an internal combustion engine wherein the rod has unitary bearing formed integrally as part of a single forming procedure. A first metal powder, such as steel, is placed in the first hopper 148 and a second metal powder, such as bronze, is placed in a second hopper 150. The first vessel 122 is also centered over the die cavity 144 by either expanding or retracting the piston 136 of the actuator cylinder 134 as necessary.

The first metal powder is introduced to the first interior cavity 124. The first powder fills the mold or die cavity 144 through the powder egress 170 with a predetermined amount of powder. The flow of first powder is stopped by the valve 149 at the powder egress 170. The piston 136 is extended until the second vessel 126 centers over the die cavity 144. Note that the powder egress 170 is advantageously not centered over the die cavity 144, allowing the second powder to deposit at the discrete location where the unitary bearing will be formed. A predetermined amount of the second powder is filled into the die cavity 144. The first and second powder fill operations are repeated until the cavity 144 is filled with a sufficient amount of metal powder to form a finished part.

The piston 136 is retracted until the first vessel 122 is clear of the upper 140 and lower 142 punches. The powder in the die cavity 144 is pressed to form a green part, advantageously once the clearance has been established. The green part is placed in a sintering oven and cooled. The cooled sintered connecting rod is machined to final tolerances. Other secondary operations, such as forging, carburizing, nitriding, or cracking the bearing cap from the remainder of the cap, may be performed without departing from the scope of the present invention. It is not necessary to provide the rod with a separate or discrete bearing at either of the piston (small) end or crank (large) end as part of a secondary operation because the unitary bearing is provided during the forming operation. A finished connecting rod results from the completion of any other secondary operations.

Figure 15:
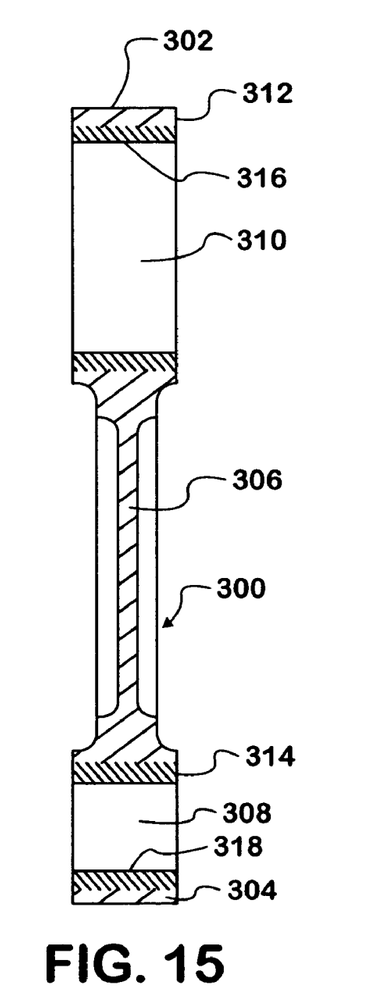
FIG. 15 is a side cutaway view of a non-homogeneous connecting rod in accordance with the present invention.
Figure 16:
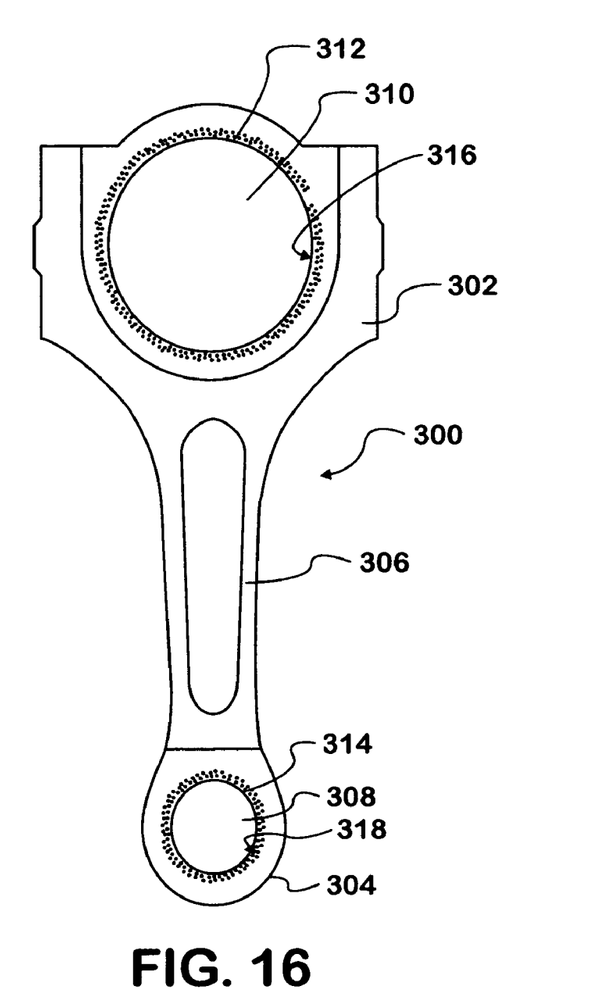
FIG. 16 is a front view of the connecting rod of FIG. 15.

A connecting rod is shown in FIG. 15 and FIG. 16. The unitary rod 300 comprises, generally, a large (crank) 302 end connected via a shank 306 to a small (piston) end 304. The piston end 304 includes a small opening or eye 308 configured to receive a wrist pin. The crank end 302 includes a large opening or eye 310 configured to receive the shaft portion of a crankshaft. The shank 306, crank end 302, and piston end 304 are advantageously comprised of a first alloy, such as steel or aluminum alloys.

A crank support surface 316 is formed at the crank end 302. The crank support surface 316 is unitarily or integrally formed with the shank 306 and ends 302, 304 as part of a single forming operation. The crank support surface 316 engages a crank pin (not shown). A wrist pin support surface 318 is formed at the piston end 304. The wrist pin support surface 318 is also unitarily or integrally formed with the shank 306 and ends 302, 304. The wrist pin support surface 318 engages a wrist pin (not shown). The support surfaces 316, 318 may be formed of a different alloy than the rest of the shank 306 and ends 302, 304, such as bronze. The crank support surface 316 is advantageously formed at the edge of an inner layer 312 that forms the opening of the large eye 310. The wrist pin support surface 318 is advantageously formed at the edge of an inner layer 314 that forms the opening of the small eye 308. Advantageously, the crank support surface 316 may be formed of one alloy, and the wrist pin support surface 318 is formed of another alloy to provide different characteristics to the surfaces, such as strength, friction, and so forth. These two alloys are advantageously different that the material comprising the majority of the shank 306, crank end 302, and piston end 304. Those of skill in the art will recognize that other alloys may be used without departing from the scope of the present invention.

Figure 13:
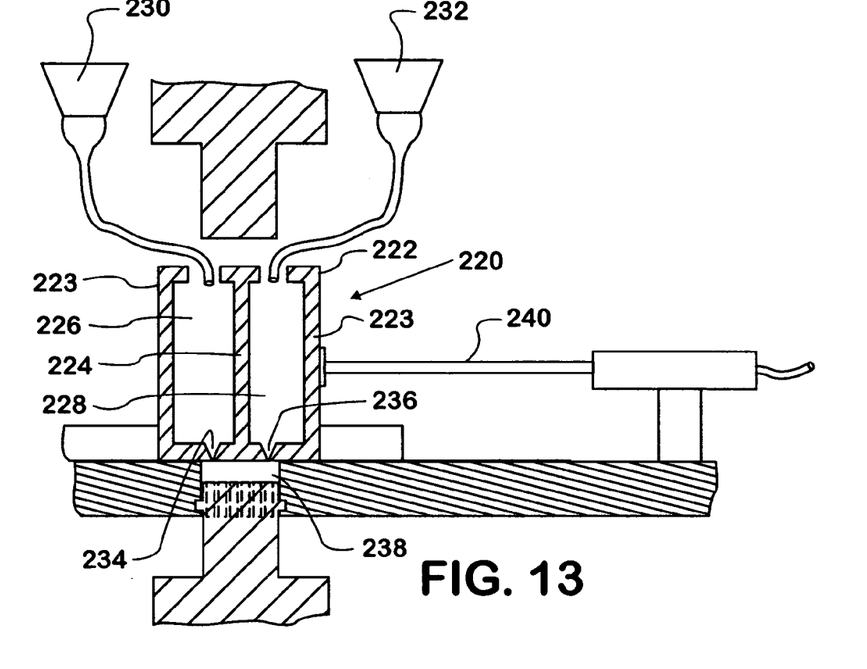
FIG. 13 is a side cutaway view of the green part forming apparatus in accordance with the present invention.

FIG. 13 depicts an alternative apparatus for forming a green part in accordance with the method of FIG. 6. The feedshoe apparatus in accordance with this embodiment comprises a single vessel 222. The vessel 222 comprises sidewalls 223 and a center divider 224. The sidewalls 223 and center divider 224 define a first section or chamber 226 and a second section or chamber 228. The first section 226 receives a first metal powder from a first hopper 230 and the second section 228 receives a second metal powder from a second hopper 232. A first powder egress 234 is provided to the first chamber 226 and a second powder egress 226 is provided to the second chamber 228.

In operation, the first and second powders may be provided to the die cavity at the same time. The respective powder egresses 234, 236 are located and sized to promote the filling of the cavity 238 with the first and second powders in their desired locations before pressing. Alternatively, the piston 240 may move the vessel 222 in a linear direction to place a respective first 234 or second 236 egress over a portion of the die cavity 238 prior to filling with a metal powder. As a further alternative, the powder egresses 234, 236 may be selectively opened and closed to create density gradients in the part or to further place a second material within the first. Additionally, a combination of the above alternatives may be employed as part of the same forming operation.

Figure 14:
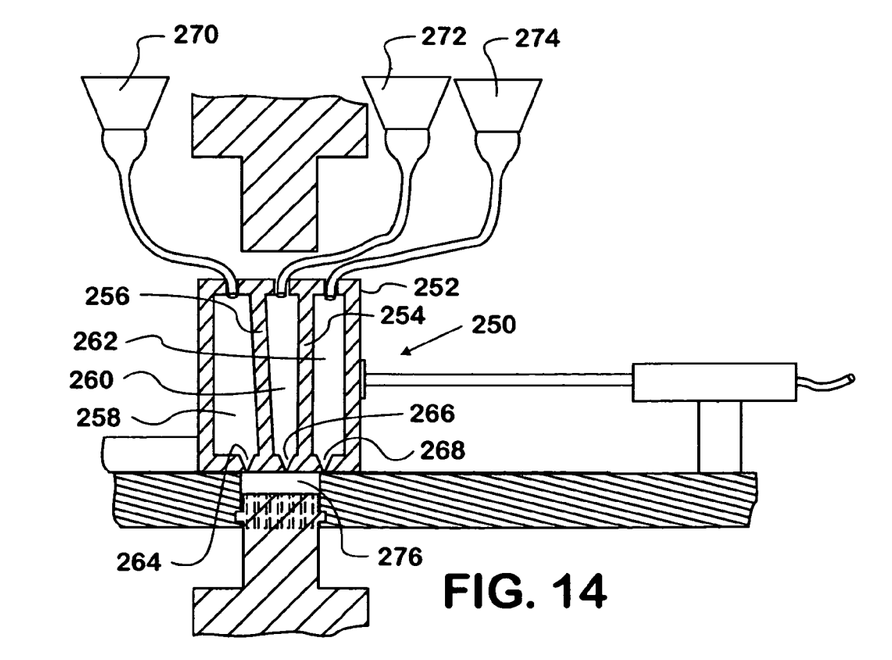
FIG. 14 is a side cutaway view of the green part forming apparatus in accordance with the present invention.

FIG. 14 depicts another alternative embodiment of the green part forming (feedshoe) apparatus 250. This embodiment again comprises a single vessel 252. The vessel comprises first 256 and second 254 dividers for defining a first chamber or section 258, a second chamber 260, and a third chamber 262. Each chamber 258, 260, and 262 receives a respective first 264, second 266, or third 268 powder egress and is in communication with a respective first 270, second 272, or third 274 hopper. Those of skill in the art will appreciate that the present invention may be practiced with more than three chambers without departing from the scope of the present invention. Moreover, a single hopper may be in communication with two or more chambers.

The use of three chambers 258, 260, and 262 allows a first of two different powders to be introduced to the die cavity 276 in two places simultaneously. Alternatively, the three chambers 258, 260, and 262 allow three powders to be introduced to the die cavity 276 as part of a single forming operation. The embodiment of FIG. 14 is operated in substantially the same manner as set forth above for the two-chamber embodiment.

The above procedure is performed to provide a component with dissimilar characteristics at discrete locations in the part. For example, a connecting rod for an internal combustion engine may be provided with an integral bearing, i.e., a support surface, by way of a single forming operation. This method of manufacturing a connecting rod eliminates the additional steps of separately forming and providing a discrete bearing and bushing to the rod, thereby saving cost, time, parts, and complexity.

Although the present invention has been described with reference to the above embodiments, those skilled in the art will recognize changes may be made in form and detail without departing from the spirit and scope of the invention. The described embodiments are to be considered in all respects only as illustrative and not restrictive. The scope of the invention is, therefore, indicated by the appended claims rather than by the foregoing description.

What is claimed is:

1. A connecting rod comprising a non-homogenous structure unitarily formed in a powder metallurgy process, the structure having a piston end, a crankshaft end, and an interconnecting shank, wherein the piston end, the crankshaft end, and the interconnecting shank are formed of a structural material, wherein the piston end has a small eye for receiving a wrist pin, wherein the small eye comprising a secondary material formed integral with the structural material, wherein the crankshaft end has a large eye for receiving a crank pin;

wherein the large eye comprises a third material formed integral with the structural material forming.

2. The connecting rod of claim 1, wherein the secondary material and the third material are different powder metals.

* * * * *